3,413,469
BURST CAN DETECTION SYSTEM
FOR NUCLEAR REACTOR
Michel Guyonvarh, Bagneux, Roger Le Meur, Verrieres-le-Buisson, and André Roguin, Antony, France, assignors to Commissariat a l'Energie Atomique, Paris, France
Filed May 11, 1965, Ser. No. 454,948
Claims priority, application France, May 13, 1964, 974,403
7 Claims. (Cl. 250—83.1)

ABSTRACT OF THE DISCLOSURE

Fuel element can failure in a gas cooled nuclear reactor are located by a number of detection units each having a delayed neutron detector and an electrostatic collection detector. The fuel channels of the reactor are grouped into assemblies and into sub-assemblies and through a valve system to a scanning circuit having a detection unit. Each assembly can be connected to a burst can follower circuit having a detection unit for electrostatic collection of solid fission products.

---

This invention relates to the detection of fuel element can failures in nuclear reactors which are cooled by circulation of gas under pressure within channels containing the fuel elements, and is more particularly directed to a detection system which is mainly applicable to ceramic fuel reactors as well as to a method of utilisation of said system.

In the majority of present-day reactors which are cooled by circulation of a gas under pressure, burst can detection is carried out by means of devices which are responsive to the presence within the coolant gas of solid ions derived from fission product gases, especially rubidium and caesium ions.

Samples of gas which are taken either periodically or continuously from the channels containing the fuel elements are conveyed to the detector after filtration and hold-up within a dead space over a period of time which is sufficient for the rubidium and caesium ions to appear. The detector devices which are most frequently employed are of the electrostatic collection type in which the Rb and Cs ions present in the sample are precipitated by an electric field onto an electrode and impart to this latter an activity which makes it possible as a result of measurement to determine the fission product concentration of the coolant gas.

Electrostatic collection detectors which are designed on this principle are well suited to the detection of can failures of the slow-burst type which occur most frequently in uranium metal reactors. In fact, fission products which escape from the can in that case essentially consist of gases which are sufficiently shortlived to result in an appreciable attenuation of their activity after circulating through a complete cycle within the reactor and mixing with the mass of coolant gas. Identification of a channel containing a defective fuel unit is thus made possible even if only a periodic sampling is performed in this channel and does not immediately follow an incipient can burst.

On the other hand, when the fuel elements are no longer formed of uranium metal but of oxide pencils or pellets which are heated to high temperatures in the central zones thereof, it may be expected that can failures will in certain cases have characteristics which differ to a marked extent from those which are met with in uranium metal reactors. In fact, as a result of the high temperature, the gaseous fission products diffuse through the ceramic fuel and finally accumulate in the free spaces beneath the can; if a crack forms in the can, a burst of radioactive gas will consequently escape and rapidly mix with all of the carbon dioxide gas of the coolant circuit and the electrostatic collection detectors are liable to be "blinded" by the general high radioactivity of the coolant gas and thus prove incapable of localizing the faulty channel with any degree of certainty. Radioactive gases which have an average lifetime (mean life) such as krypton-88 and xenon-138 can be considered as particularly troublesome by reason of the fact that, after a few circulation cycles within the reactor coolant circuit, equal signals are produced in all detectors by the solid daughter products of said gases.

One method of solving this problem, of course, consists in sampling continuously from all channels in order to detect the radioactive gas burst as soon as it appears and prior to dilution in all of the coolant gas. However, this solution introduces considerable complication in the design of the detection gear.

This invention is directed to the design of a burst can detection system which utilizes the known principle of detection of the delayed neutrons emitted by certain intermediate products of radioactive disintegration which result in the appearance of stable daughter elements. By way of example, the diagrams hereunder give the two types of disintegration of bromine-87 and iodine-137:

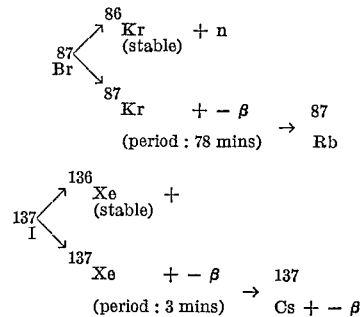

Inasmuch as those intermediate products whose decay is accompanied by neutron emission are relatively short-lived (iodine-137: 22 secs.; bromine-89: 4.5 secs.; bromine-87: 56 secs.), the activity of these neutron-emitters will have decreased to a considerable extent after a few cycles of circulation through the reactor and the contrast (defined as the relative increase of specific activity) between the samples derived from the faulty channel and those derived from the other channels will remain sufficient to localize the first with a high degree of probability in the event of emission of a burst of fission products.

With the above object in mind, this invention proposes a burst can detection system for nuclear reactors which are cooled by circulation of gas under pressure within channels containing fuel elements, said system being characterized in that it entails the use of a plurality of detection units formed by the association of a delayed-neutron detector and an electrostatic collection detector. Each delayed-neutron detector is preferably formed by a filter for holding-back iodine and bromine from gas samples taken successively from different channels, and by a device for selectively measuring the neutron emission of said filters.

The filter of each delayed-neutron detector is located upstream of the volume for the formation of rubidium and caesium ions of a solid fission product detector.

In the burst can detection system for nuclear reactors in accordance with the invention, the fuel channels are grouped together in assemblies which are in turn divided into sub-assemblies, each sub-assembly of one channel assembly being connected in turn through a valve system to a scanning circuit which is provided with a detection unit.

Finally, in accordance with a characteristic feature of the invention, each channel assembly can be associated by means of a valve system with a burst follower circuit which comprises a detection unit consisting of a delayed-neutron detector and a detector for the electrostatic collection of solid fission products.

The invention is also concerned with a method for the utilization of the system in accordance with the invention which consists within each channel assembly in the successive scanning of each sub-assembly and, when the activity detected in a single sub-assembly by the solid fission product detector oversteps a predetermined threshold, in connecting said sub-assembly to the burst follower circuit.

In accordance with an alternative form, the method for the utilization of the system in accordance with the invention consists within each channel assembly in the successive scanning of each sub-assembly and, when the activity detected by all of the solid fission-product detectors simultaneously oversteps a predetermined threshold, in determining that sub-assembly among those simultaneously analyzed which has an activity in excess of the mean value of sub-assembly activities, in checking whether the activity indicated by the delayed-neutron detector in respect of said sub-assembly oversteps another predetermined threshold and, should this in fact prove to be the case, in connecting said sub-assembly to the burst follower detector for identification of the channel.

The use of a filter permits the accumulation of the entire quantity of bromine and iodine which is present in a sample and, provided that the measurement of activity is taken as and when the sample has passed through, increases the sensitivity of the method.

The invention is also directed to the design concept of a mode of operation which entails the use of two types of detection and which serves to localize with a high degree of probability a channel containing a faulty fuel element.

A better understanding of the invention will be gained from a perusal of the following description of one mode of practical application which is given solely by way of non-limitative example. Reference is made in the description to the accompanying drawings, in which.

Figure 1:
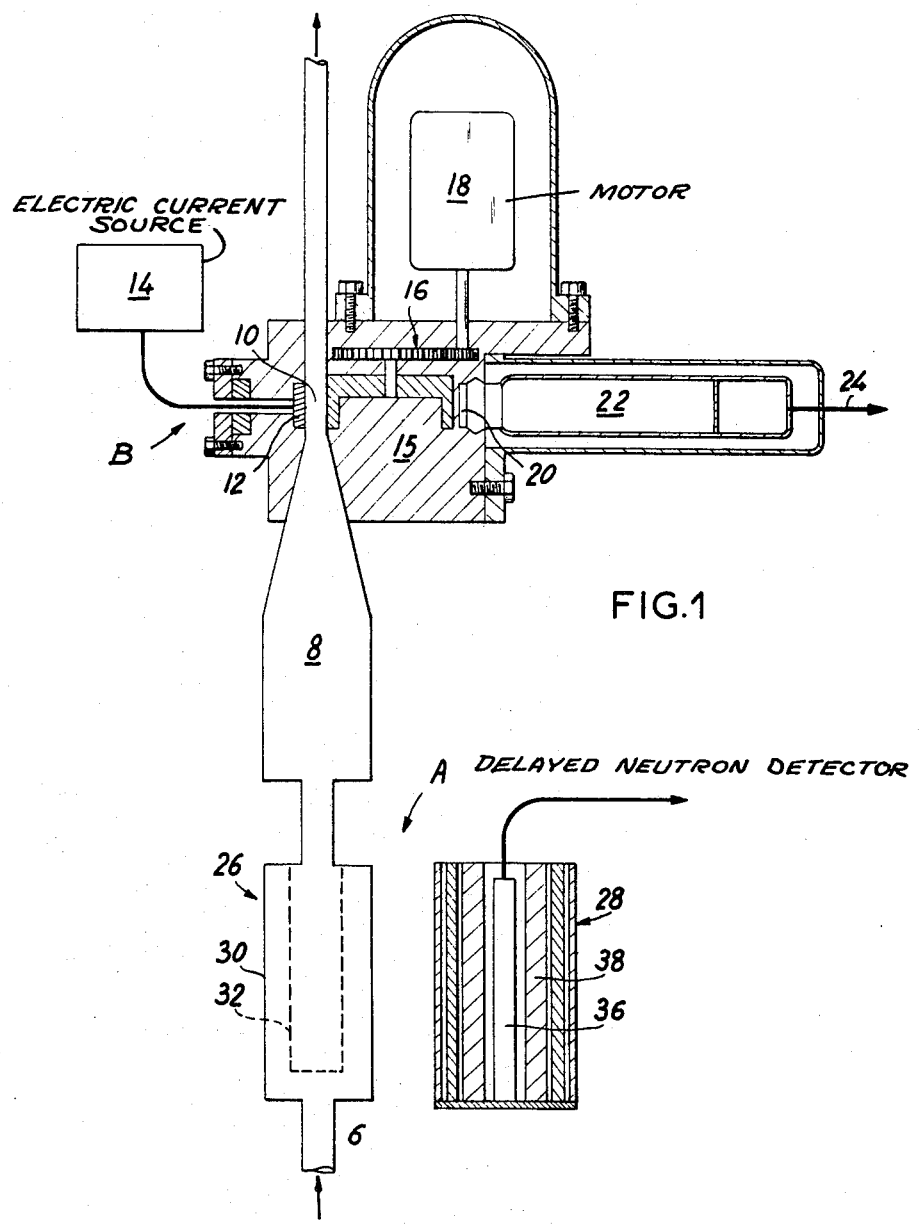
FIG. 1 is a diagrammatic view in longitudinal cross-section of the complete assembly consisting of a delayed-neutron detector and an electrostatic collection detector which are serially arranged in a same duct.

The detection unit which is illustrated in FIG. 1 is designed for the purpose of monitoring the samples of coolant gas which are conveyed through the duct 6. Serially arranged in said duct 6 are the delayed-neutron detector which is generally designated by the reference A and a conventional electrostatic precipitation detector which is designated by the reference B. The electrostatic precipitation detector B which is illustrated in the diagram comprises in the duct 6 a formation volume 8 in which the gas to be analyzed arrives after filtration and in which said gas remains for a period of time which is sufficient to result in the appearance of the rubidium and caesium ions to be detected. These ions then pass into the collection chamber 10 in which a repulsion electrode 12, which is brouhgt to a positive high-voltage by a source 14 of electric current, effects the deposition of said ions over a zone of the drum 15 which is connected to ground (earth). The drum 15 is driven in rotation by means of a gear-train 16 from a motor 18 located in a leak-tight housing.

Under operating conditions, the drum is first maintained in a fixed angular orientation over a period of time which is sufficient to ensure that the zone located opposite to the chamber 10 collects a sufficient quantity of radioactive ions, and is then moved to another orientation in which the zone faces opposite to a scintillation counter 20 fitted with a photo-multiplier 22 which is connected to a measuring chain by means of a conductor 24.

Figure 2:
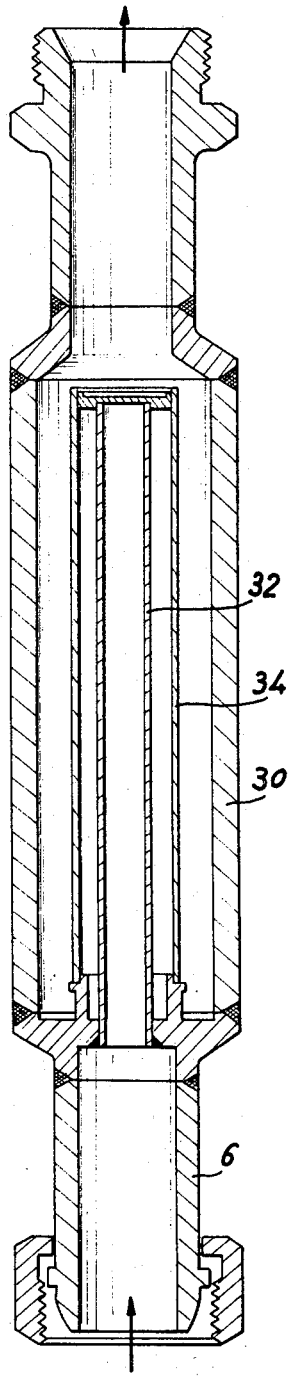
FIG. 2 is a diagrammatic view in cross-section on a plane passing through the axis of a filter which is designed for use in the device of FIG. 1.

The delayed-neutron detector A essentially comprises a filter 26 for the selective retention of iodine and bromine and a measuring instrument 28. The filter which is illustrated in FIG. 2 consists of a leak-tight sleeve 30 in which is fitted a filter element 32 consisting of a barrier which selectively retains or holds up iodine and bromine. The filter can usefully be fitted with a tubular filter element 32 of sintered bronze, the mechanical strength of which is ensured by associating said filter element with a second tubular element 34 of sintered stainless steel, for example (FIG. 2). In order that the retention or hold-up of said filter should prove satisfactory, it will evidently be necessary to ensure that the temperature of the filter and of the samples is not excessive.

There is placed near the filter 26 an apparatus for measuring neutron flux which consists of a boron counter tube 36 placed within a mass 38 of neutron-moderating material. In the form of embodiment which is illustrated in FIG. 1, the counter tube, which is of the boron trifluoride type, is enclosed within a series of tubular screens of paraffin wax or polythene.

The analysis which is performed by means of the detector necessarily entails the complete transfer of one sample through the filter for the accumulation of iodine and bromine in said filter and, immediately before transfer of the following sample, the measurement of the neutronic activity of the filter.

The practical advantage which lies in the association of detectors A and B, one of which is responsive to the presence of solid daughter products whilst the other is responsive to the presence of neutron emitters will be readily apparent. Accordingly, in the event of a slow can-burst, the electrostatic collection detector B remains unaffected by the long-lived fission product gases such as xenon-133 and zenon-135 and iodine-131 since it samples only beta-emitting solid ions (rubidium and caesium). In the event of an increase in the concentration of these fission gases, the background of detectors B will slightly increase as a result of an increase in stray radiation, but the contrast between the activity within the faulty channel and that of the other channels will remain sufficient to permit of satisfactory localization; the sensitivity of detectors B will be greater than that of detector A in which there always remains a high background resulting in particular from the presence in the coolant gas, if the coolant is carbon dioxide, of the neutron emitter consisting of nitrogen-17 which is formed by irradiation of oxygen.

On the contrary, a sudden can failure causes the release of a burst of long-lived fission gases which are distributed throughout the coolant circuit. The samples taken from all channels will contain these gases and will then produce within the electrostatic collection detectors Rb and Cs ions which will give rise to the appearance of signals of the same order within all of the detectors and will usually overstep the alarm threshold. As a consequence, the indications of the electrostatic collection detectors will become of no further use in localizing the faulty channel. On the other hand, the delayed-neutron detectors which are non-responsive to long-lived fission products accordingly permit of localization.

This differential action makes it possible by associating the indications of the two types of detectors to localize a faulty channel with practically unerring certainty by virtue of a method of utilization which is proposed by the invention and which will now be described in reference to one particular example which is not given in any limiting sense and which corresponds to the diagram of FIG. 3.

Figure 3:
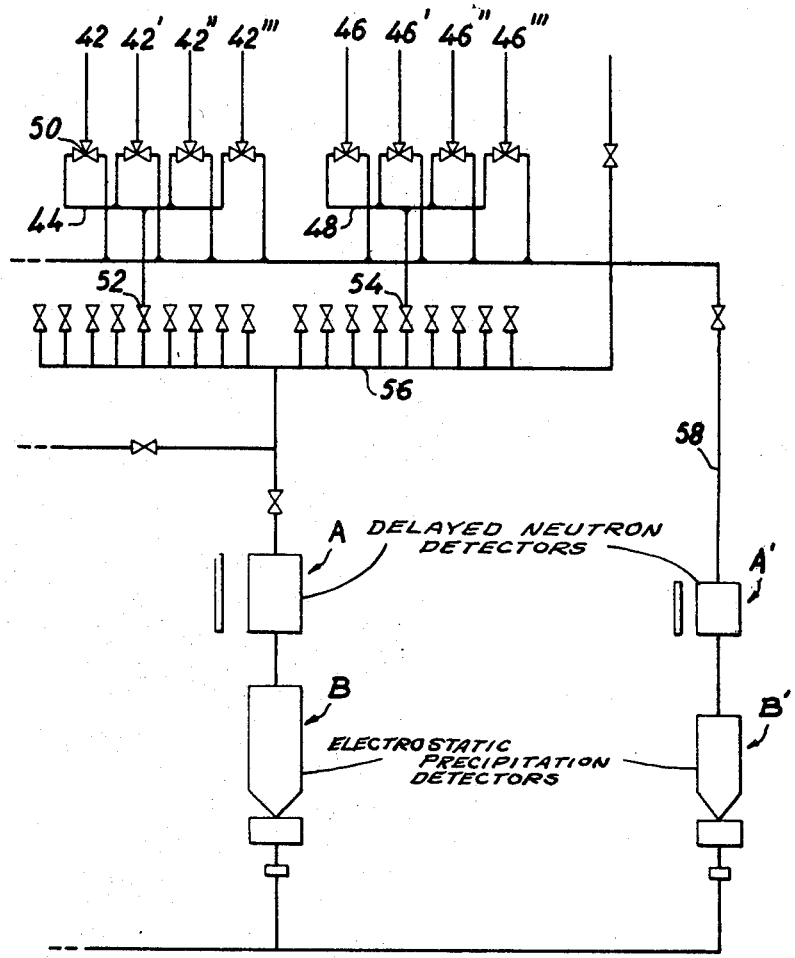
FIG. 3 is a general arrangement diagram showing the arrangement of a portion of the burst can detection system of a reactor, wherein said portion corresponds to a faction of the total number of channels and must accordingly be reproduced a number of times in order to equip all of the reactor channels.

FIG. 3 shows diagrammatically two sub-assemblies or groups of sampling ducts; the first group consists of four sampling ducts 42, 42′, 42″, and 42‴ which join four reactor channels to a collector 44; the second group also consists of four ducts 46, 46′, 46″, 46‴, which join four other reactor channels to another collector 48. Under normal operating conditions, valves such as the valve 50 (or only a single star valve) put all of the ducts 42, 42′ ... or 46, 46′ ... into communication with the corresponding duct collector 44 or 48.

A whole series of duct collectors such as the collectors 44 and 48 open through valves such as those designated by the references 52 and 54 into a group collector 56 which feeds the two serially-arranged detectors A and B, thus constituting a so-called "scanning unit." Under normal operating conditions, a duct 58 is separated from each of the ducts such as 42 and 46 by the corresponding valve such as the valve 50. There is interposed in said duct 58 a so-called "burst follower" unit consisting of two detectors A′ and B′. Each valve such as the valve 50 also serves to separate the corresponding duct 42 or 46 of the collector 44 and to connect said duct to the duct 58 which is provided with the burst follower unit.

The detection system consists of a number of independent assemblies of similar design to that which has just been described. For example, said system can consist of three assemblies each consisting of eighteen sub-assemblies of four ducts such as those designated by the references 42 and 46.

A typical operation program will now be described by way of example. Under normal operating conditions, each duct collector such as the collector 44 or 48 is connected in turn via its valve such as the valve 52 or 54 to the collector 56 and analyzed by the scanning unit. The corresponding sample, which re-groups samples derived from four channels, is analyzed by the detectors A and B, and the above process continues as long as the activity detected by the detection units in the collectors such as those designated by the references 44 or 48 does not overstep a predetermined threshold $S_1$.

If, on the contrary, the activity which is detected by the detector B of one of the scanning units oversteps the threshold $S_1$, two cases can thus arise and lead to the utilization of two different subprograms:

(1) If excess activity remains localized during several cycles in a single duct collector such as the collector 44, for example, there has accordingly taken place a slow can-burst in one of the four channels 42, 42′, 42″ and 42‴ which open into the collector 44 at the seat of abnormal activity as thus detected. The four successive samples are then conveyed through the supply duct 58 of the burst follower unit by means of valves 50 which are associated with said four channels. Said burst follower unit, and in particular the electrostatic collection detector B′ which has higher sensitivity than the detector A′ will accordingly identify the faulty channel. Said channel will remain continuously connected to the burst follower unit for the continuous monitoring of the channel and use can also be made of a power-variation meter for this purpose.

(2) If, on the contrary, the activities which are located by the detectors B in all the reactor scanning units (provision being made for three such units, for example) simultaneously overstep the threshold $S_1$, the mean value of the activities of all the scanners is calculated in respect of each unitary cycle (corresponding to one measurement taken on one sub-assembly by each detector). The particular sub-assembly which has a level of activity above the mean value will be suspected of having been the location of a can failure resulting in the emission of burst of fission product gas.

If the delayed-neutron detector A corresponding to the detector B of said scanner produces while analyzing said sub-assembly, and during the same cycle, a signal indicating a level of activity which is higher than a threshold which is also predetermined, said sub-assembly is transferred to the burst follower unit for the purpose of localizing the faulty channel by the same process and for monitoring its development. If, on the contrary, the detector A only indicates an activity which is lower than the selected threshold, the scanning operation is continued in the follower sub-assemblies until final identification of the faulty sub-assembly.

There still remains the exceptional case in which the activities detected by all of the scanning units were to overstep at the same time a threshold $S_2$ which is in the vicinity of saturation of the apparatus, thus indicating the possible occurrence of a number of failures in a same channel. It would in that case be necessary to store the numbers of the last sub-assemblies analyzed and to lower the reactor power rapidly.

It can therefore be visualized that, by combining the sensitivity of the solid-product collection detectors (with are usually of the electrostatic scanning type) and the selectivity of the delayed-neutron detectors, the invention makes it possible to maintain the sensitivity of prior art devices while permitting the localization of a faulty channel irrespective of the type of can failure which has occurred therein. Finally, it must be understood that the examples described are not given in any limiting sense and that any alternative forms of either all or a part of the arrangements described which remain within the definition of equivalent means are covered by this patent.

What we claim is:

1. Burst can detection system for nuclear reactors cooled by circulation of gas under pressure within channels containing fuel elements, comprising a plurality of detection units receiving samples of gas from selected ones of the channels, each of said units including a delayed-neutron detector and an electrostatic collection detector connected in series, the delayed neutron detector first receiving the gas.

2. Burst can detection system for nuclear reactors as claimed in claim 1, each of said delayed-neutron detectors including a filter for holding-back iodine and bromine from the samples of gas taken successively from different channels and means for selectively measuring the neutron emission of said filter.

3. Burst can detection system for nuclear reactors as claimed in claim 2, including a volume for the formation of rubidium and caesium ions of a solid fission product detector between the filter and the electrostatic precipitation detector.

4. Burst can detection system for nuclear reactors as claimed in claim 3, the fuel channels being grouped in assemblies each assembly being divided into sub-assemblies and the channels of each sub-assembly being connected in turn through a valve to one of said detection units.

5. Burst can detection system for nuclear reactors as claimed in claim 4, including a burst follower unit comprising a delayed-neutron detector and a detector for the electrostatic collection of fission products, each channel assembly being associated by means of a valve system with said burst follower unit.

6. Method of burst can detection for nuclear reactors which are cooled by circulation of gas under pressure within channels containing fuel elements, the fuel channels being arranged in assemblies and in sub-assemblies connected to a scanning circuit comprising a detection unit having a delayed-neutron detector and an electrostatic collection detector as well and to a burst follower circuit having a detection unit, the steps of successively scanning each sub-assembly and, when the activity detected in a single sub-assembly by the the electrostatic collection detector passes a predetermined threshold, then connecting said sub-assembly to the burst follower circuit.

7. Method of burst can detection for nuclear reactors which are cooled by circulation of gas under pressure within channels containing fuel elements, the fuel channels being grouped in sub-assemblies and in assemblies connected to a scanning circuit comprising a detection unit having a delayed-neutron detector and an electrostatic collection detector and to a burst follower circuit having a detection unit, the steps of successively scanning each sub-assembly and, when the activities which are detected by all of the solid fission product detectors simultaneously pass a predetermined threshold, then isolating the sub-assembly among those simultaneously analyzed which has an activity in excess of the mean value of sub-assembly activities, then connecting the delayed-neutron detector of said sub-assembly to said sub-assembly to determine whether the activity passes another predetermined threshold and then connecting said sub-assembly to the burst follower detector for identification of the channel.

References Cited

UNITED STATES PATENTS

| | | | |
|---|---|---|---|
| 3,084,254 | 4/1963 | Goupil et al. | 250—83.6 |
| 3,138,710 | 6/1964 | Roguin et al. | 250—83.6 |
| 3,227,878 | 1/1966 | Nairn et al. | 176—19 X |
| 3,291,986 | 12/1966 | Lamb | 250—83.6 X |

ARCHIE R. BORCHELT, *Primary Examiner.*